US007755612B2

(12) United States Patent
Park et al.

(10) Patent No.: US 7,755,612 B2
(45) Date of Patent: Jul. 13, 2010

(54) TOUCH DETECTABLE DISPLAY DEVICE AND DRIVING METHOD THEREOF

(75) Inventors: Sang-Jin Park, Gyeonggi-do (KR); Kee-Han Uh, Gyeonggi-do (KR); Myung-Woo Lee, Gyeonggi-do (KR); Joo-Hyung Lee, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1020 days.

(21) Appl. No.: 11/234,720

(22) Filed: Sep. 23, 2005

(65) Prior Publication Data
US 2006/0077186 A1 Apr. 13, 2006

(30) Foreign Application Priority Data
Sep. 24, 2004 (KR) .................. 10-2004-0077516

(51) Int. Cl.
G06F 3/041 (2006.01)
G06F 3/045 (2006.01)
G06F 3/042 (2006.01)
G02F 1/1335 (2006.01)
G02F 1/13 (2006.01)

(52) U.S. Cl. .................. 345/173; 345/104; 345/207; 178/18.09

(58) Field of Classification Search ......... 345/173–176, 345/207, 104, 102; 178/18.09, 18.11
See application file for complete search history.

(56) References Cited

U.S. PATENT DOCUMENTS 5,105,186 A 4/1992 May
5,847,690 A 12/1998 Boie et al.
7,009,663 B2 * 3/2006 Abileah et al. .............. 349/12
7,280,102 B2 * 10/2007 Abileah et al. ............. 345/204
7,310,090 B2 * 12/2007 Ho et al. .................... 345/175
7,382,360 B2 * 6/2008 Mackey et al. ............. 345/173
2006/0262099 A1 * 11/2006 Destura et al. ............. 345/173

FOREIGN PATENT DOCUMENTS

CN 1527274 A 9/2004
JP 10161810 A 6/1998

OTHER PUBLICATIONS

Abstract of Chinese Publication No. 152724, Sep. 8, 2004, C. J. Brown, 1 pages.

* cited by examiner

*Primary Examiner*—Sumati Lefkowitz
*Assistant Examiner*—Seokyun Moon
(74) *Attorney, Agent, or Firm*—Innovation Counsel LLP

(57) ABSTRACT

A display device is disclosed which includes: a display panel; a lighting unit to illuminate the display panel and having a state in response to a lighting control signal; a pressure sensing unit generating a first sensor output signal according to a touch on the display panel; a light sensing unit receiving light from the lighting unit and ambient light and generating a second sensor output signal according to the touch on the display panel; a sensor scanning driver outputting sensor scanning signals to the pressure sensing unit and the light sensing unit in response to a sensor scanning control signal; and a sensing controller generating the lighting control signal and the sensor scanning control signal based on the first and the second sensor output signals and outputting the lighting control signal to the lighting unit and the sensor scanning control signal and the sensor scanning driver.

16 Claims, 13 Drawing Sheets

TOUCH DETECTABLE DISPLAY DEVICE AND DRIVING METHOD THEREOF

BACKGROUND OF THE INVENTION (a) Field of the Invention

The present invention relates to a display device and a driving method thereof and in particular, a touch detectable display device and a driving method thereof.

(b) Description of Related Art

A liquid crystal display (LCD) includes a pair of panels provided with pixel electrodes and a common electrode and a liquid crystal layer with dielectric anisotropy interposed between the panels. The pixel electrodes are arranged in a matrix and connected to switching elements such as thin film transistors (TFTs) such that they receive image data voltages row by row. The common electrode covers entire surface of one of the two panels and it is supplied with a common voltage. A pixel electrode and corresponding portions of the common electrode, and corresponding portions of the liquid crystal layer form a liquid crystal capacitor that as well as a switching element connected thereto is a basic element of a pixel.

An LCD generates electric fields by applying voltages to pixel electrodes and a common electrode and varies the strength of the electric fields to adjust the transmittance of light passing through a liquid crystal layer, thereby displaying images.

Recently, an LCD incorporating photosensors has been developed. The photosensors senses the change of incident light caused by a touch of a finger or a stylus and provides electrical signals corresponding thereto for the LCD. The LCD determines whether and where a touch exists based on the electrical signals. The LCD sends the information on the touch to an external device that may return image signals to the LCD, which are generated based on the information. Although the photosensors may be provided on an external device such as a touch screen panel to be attached to the LCD, it may increase the thickness and the weight of the LCD and it may make it difficult to represent minute characters or pictures.

A photosensor incorporated into an LCD may be implemented as a thin film transistor (TFT) disposed in a pixel displaying an image. However, such a photosensor generates an output that varies depending on a circumference such as the intensity of an external light or of a backlight lamp, and thus there is an area where a touch may not be easily detected. This area is referred to as a dead zone and a photosensor in the dead zone generates an output having levels that may not be easily distinguished with and without a touch.

SUMMARY OF THE INVENTION

A display device according to an embodiment of the present invention includes: a display panel; a lighting unit illuminating the display panel and having a state in response to a lighting control signal; a pressure sensing unit generating a first sensor output signal according to a touch on the display panel; a light sensing unit receiving light from the lighting unit and ambient light and generating a second sensor output signal according to the touch on the display panel; a sensor scanning driver outputting sensor scanning signals to the pressure sensing unit and the light sensing unit in response to a sensor scanning control signal; and a sensing controller generating the lighting control signal and the sensor scanning control signal based on the first and the second sensor output signals and outputting the lighting control signal to the lighting unit and the sensor scanning control signal and the sensor scanning driver.

The display device may further include: a pressure calculation unit determining whether a touch exists to generate a pressure information signal based on the first sensor output signal; and a position calculation unit determining where a touch exists to generate a position information signal based on the second sensor output signal.

When the pressure information signal indicates that a touch exists and the position information signal is not available, the sensing controller may determine that the display device is in a dead zone.

When it is determined that the display device is in a dead zone, the sensing controller may generate the lighting control signal to convert the state of the lighting unit relative to a light sensing period of the light sensing unit.

The lighting control signal may control a luminance of the lighting unit. The luminance of the lighting unit may be controlled by turning on or off the lighting unit or by changing a current in the lighting unit.

The lighting control signal may control a phase of a driving voltage of the lighting unit. A duty ratio of the driving voltage of the lighting unit may be from about 40% to about 60%.

The phase of the driving voltage may range from about −10° to about 10° and form about 170° to about 190° if the phase of the driving voltage is defined to be 0° when the phase of the driving voltage is synchronized with the sensor scanning signals.

The sensing controller may control a light sensing period of the light sensing unit according to an on/off state of the lighting unit in the dead zone.

The pressure sensing unit and the light sensing unit may be disposed on the display panel.

The display device may be a liquid crystal display.

A method of driving a display device including a display panel and a lighting unit according to an embodiment of the present invention includes: generating a first sensing signal based on a pressure exerted on a display panel; generating a pressure information signal depending on the first sensing signal; generating a second sensing signal based on a light from the lighting unit and an ambient light; generating a position information signal depending on the second sensing signal; determining whether the display device is in a dead zone based on the pressure information signal and the position information signal; and performing a control operation by controlling the lighting unit or by controlling a timing for generating the second sensing signal when the display device is in the dead zone.

The determination of whether the display device is in a dead zone may include: determining that the display device is in the dead zone when the pressure information signal indicates that a touch exists and the position information signal is not available.

The control of the lighting unit may include: controlling a luminance of the lighting unit. The control of the luminance of the lighting unit may include: changing an on/off state of the lighting unit or changing a current in the lighting unit.

The control of the lighting unit may include: changing a phase of a driving voltage of the lighting unit relative to the timing for generating the second sensing signal.

The control of the timing for generating the second sensing signal may include: changing the timing for generating the second sensing signal relative to a phase of a driving voltage of the lighting unit.

BRIEF DESCRIPTION OF THE DRAWINGS

The present invention will become more apparent by describing embodiments thereof in detail with reference to the accompanying drawing in which.

DETAILED DESCRIPTION OF THE PREFERRED EMBODIMENTS

Figure 1:
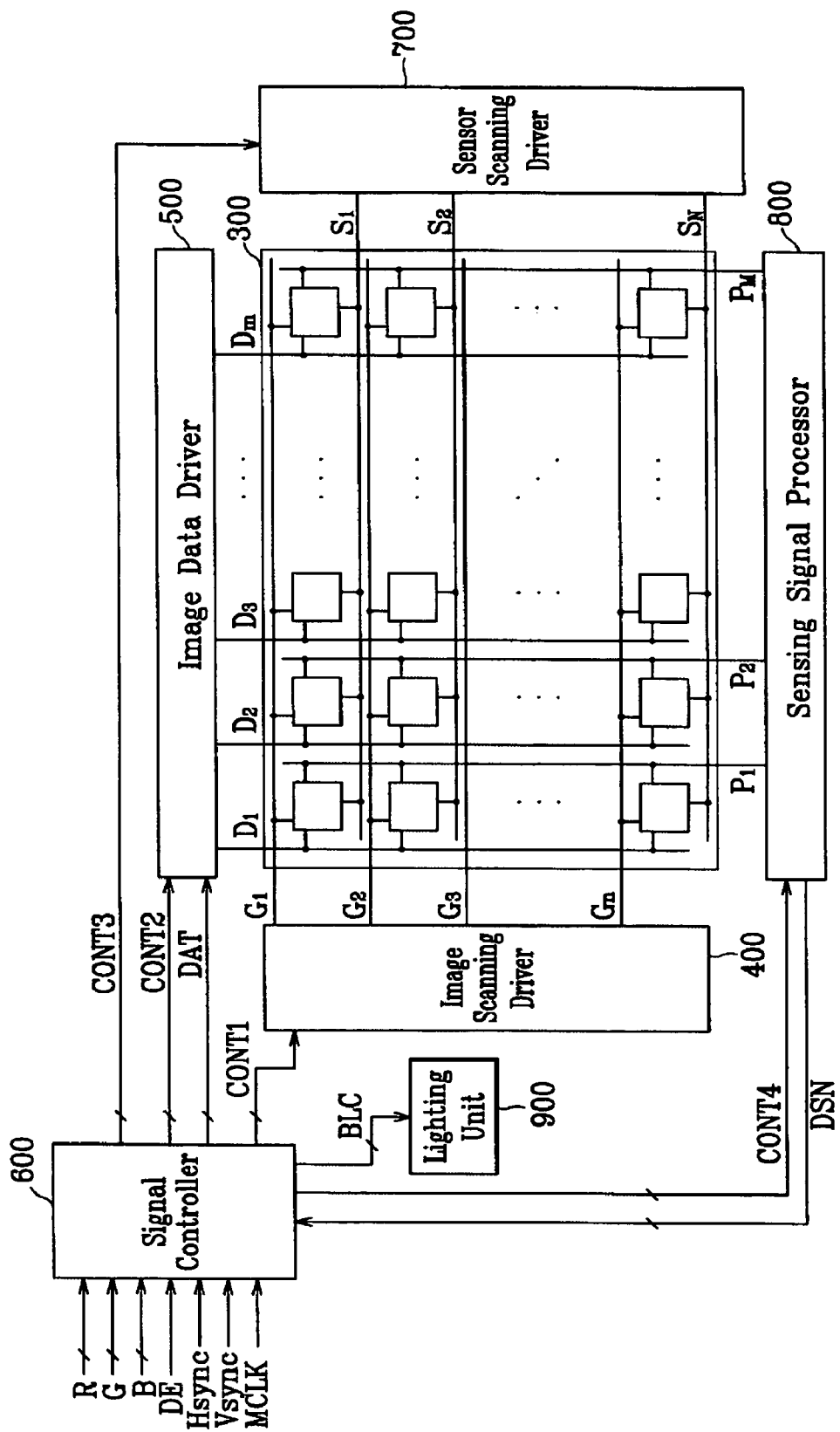
FIG. 1 is a block diagram of an LCD according to an embodiment of the present invention.

The present invention is described below more fully with reference to the accompanying drawings, in which preferred embodiments of the invention are shown.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

A liquid crystal display according to an embodiment of the present invention is described below in detail with reference to FIGS. 1, 2 and 3.

Figure 2:
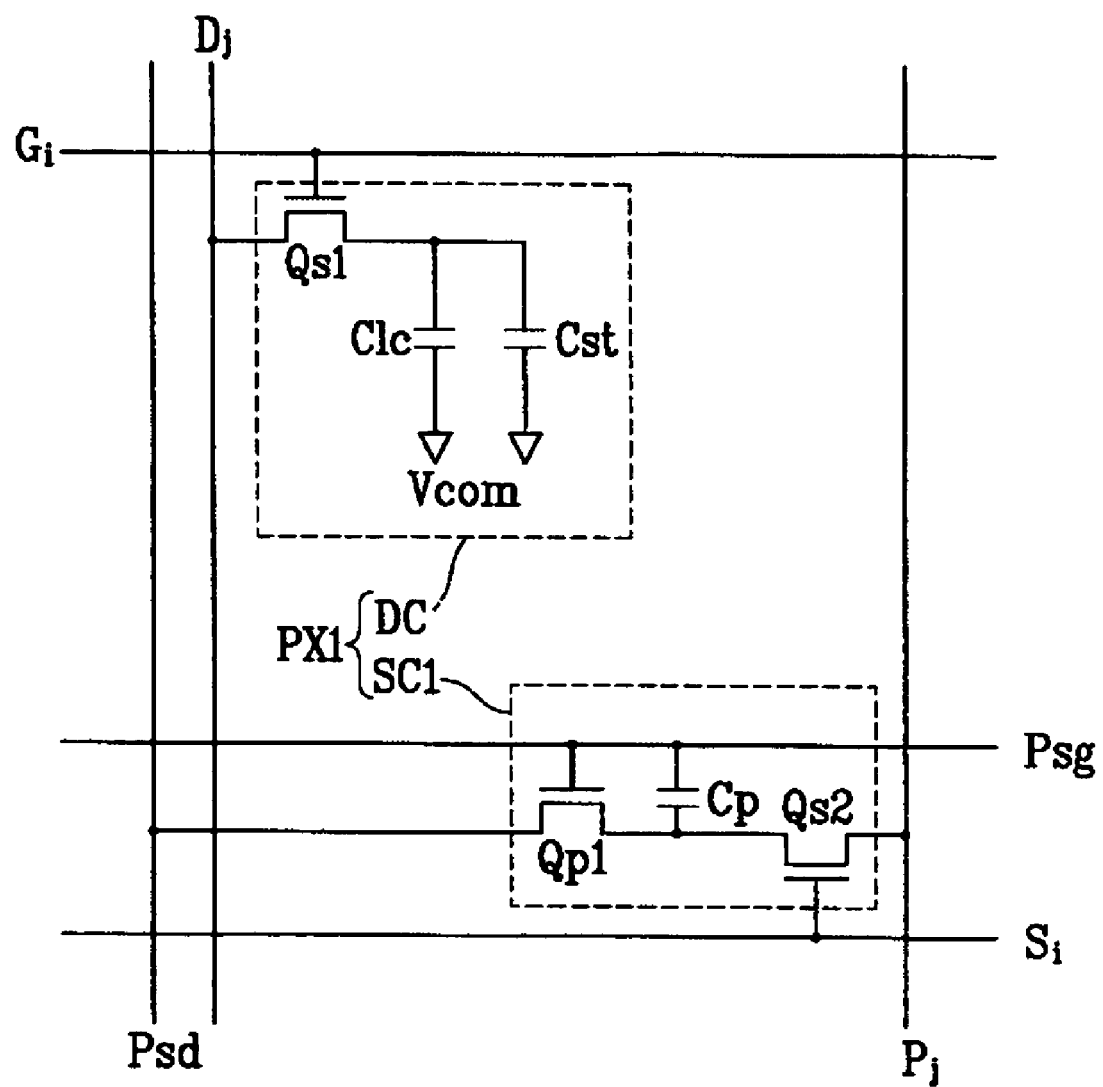
FIG. 2 is an equivalent circuit diagram of a pixel including a light sensing circuit for an LCD according to an embodiment of the present invention.
Figure 3:
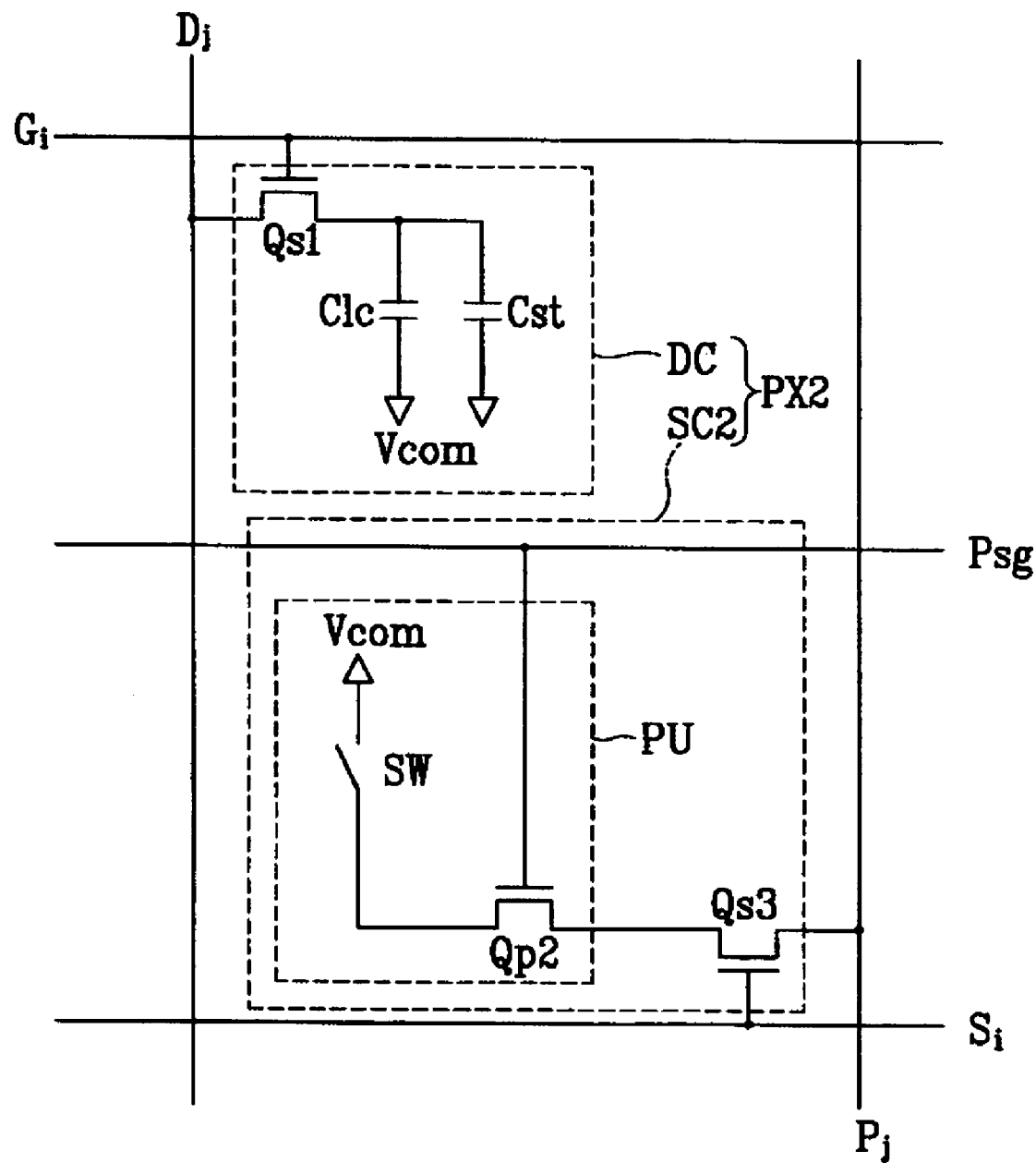
FIG. 3 is an equivalent circuit diagram of a pixel including a pressure sensing circuit for an LCD according to an embodiment of the present invention.

FIG. 1 is a block diagram of an LCD according to an embodiment of the present invention, FIG. 2 is an equivalent circuit diagram of a pixel including a light sensing circuit for an LCD according to an embodiment of the present invention, and FIG. 3 is an equivalent circuit diagram of a pixel including a pressure sensing circuit for an LCD according to an embodiment of the present invention.

Referring to FIG. 1, an LCD according to an embodiment includes a liquid crystal (LC) panel assembly 300, an image scanning driver 400, an image data driver 500, a sensor scanning driver 700, and a sensing signal processor 800 that are coupled with the panel assembly 300, a lighting unit 900 supplying light to the panel assembly 300, and a signal controller 600 controlling the above elements.

Referring to FIGS. 1 and 2, the panel assembly 300 includes a plurality of display signal lines G1-Gn and D1-Dm, a plurality of sensor signal lines S1-SN, P1-PM, Psg and Psd, and a plurality of pixels PX. The pixels PX are connected to the display signal lines G1-Gn and D1-Dm and the sensor signal lines S1-SN, P1-PM, Psg and Psd and arranged substantially in a matrix.

The display signal lines include a plurality of image scanning lines G1-Gn transmitting image scanning signals and a plurality of image data lines D1-Dm transmitting image data signals.

The sensor signal lines include a plurality of a plurality of sensor scanning lines S1-SN transmitting sensor scanning signals, a plurality of sensor data lines P1-PM transmitting sensor data signals, a plurality of control voltage lines Psg transmitting a sensor control voltage, and a plurality of input voltage lines Psd transmitting a sensor input voltage.

The image scanning lines G1-Gn and the sensor scanning lines S1-SN extend substantially in a row direction and substantially parallel to each other, while the image data lines D1-Dm and the sensor data lines P1-PM extend substantially in a column direction and substantially parallel to each other.

Referring to FIGS. 2 and 3, each pixel PX, for example, a pixel PX1 or PX2 in the i-th row (i=1, 2, . . . , n) and the j-th column (j=1, 2, . . . , m) includes a display circuit DC connected to display signal lines Gi and Dj and a light sensing circuit SC1 connected to sensor signal lines Si, Pj, Psg and Psd or a pressure sensing circuit SC2 connected to sensor signal lines Si, Pj and Psg. However, only a given number of the pixels PX may include the sensing circuits SC1 or SC2. In other words, the concentration of the sensing circuits SC1 and SC2 may be varied and thus the number N of the sensor scanning lines S1-SN and the number M of the sensor data lines P1-PM may be varied.

The display circuit DC includes a switching element Qs1 connected to an image scanning line Gi and an image data line Dj, and a LC capacitor Clc and a storage capacitor Cst that are connected to the switching element Qs1. The storage capacitor Cst may be omitted.

The switching element Qs1 has three terminals, i.e., a control terminal connected to the image scanning line Gi, an input terminal connected to the image data line Dj, and an output terminal connected to the LC capacitor Clc and the storage capacitor Cst.

The LC capacitor Clc includes a pair of terminals and a liquid crystal layer (not shown) interposed therebetween and it is connected between the switching element Qs1 and a common voltage Vcom.

The storage capacitor Cst assists the LC capacitor Clc and it is connected between the switching element Qs1 and a predetermined voltage such as the common voltage Vcom.

The light sensing circuit SC1 shown in FIG. 2 includes a light sensing element Qp1 connected to a control voltage line Psg and an input voltage line Psd, a sensor capacitor Cp connected to the light sensing element Qp1, and a switching element Qs2 connected to a sensor scanning line Si, the light sensing element Qp1, and a sensor data line Pj.

The light sensing element Qp1 has three terminals, i.e., a control terminal connected to the control voltage line Psg to be biased by the sensor control voltage, an input terminal connected to the input voltage line Psd to be biased by the sensor input voltage, and an output terminal connected to the switching element Qs2. The light sensing element Qp1 includes a photoelectric material that generates a photocurrent upon receipt of light. An example of the light sensing element Qp1 is a thin film transistor having an amorphous silicon or polysilicon channel that can generate a photocurrent. The sensor control voltage applied to the control terminal of the light sensing element Qp1 is sufficiently low or sufficiently high to keep the light sensing element Qp1 in an off state without incident light. The sensor input voltage applied to the input terminal of the light sensing element Qp1 is sufficiently high or sufficiently low to keep the photocurrent flowing in a direction. The photocurrent flows toward the switching element Qs2 by the sensor input voltage and it also flows into the sensor capacitor Cp to charge the sensor capacitor Cp.

The sensor capacitor Cp is connected between the control terminal and the output terminal of the light sensing element Qp1. The sensor capacitor Cp stores electrical charges output from the light sensing element Qp1 to maintain a predetermine voltage. The sensor capacitor Cp may be omitted.

The switching element Qs2 also has three terminals, i.e., a control terminal connected to the sensor scanning line Si, an input terminal connected to the output terminal of the light sensing element Qp1, and an output terminal connected to the sensor data line Pj. The switching element Qs2 outputs a sensor output signal to the sensor data line Pj in response to the sensor scanning signal from the sensor scanning line Si. The sensor output signal may be the sensing current from the light sensing element Qp1. However, the sensor output signal may be a voltage stored in the sensor capacitor Cp.

The pressure sensing circuit SC2 shown in FIG. 3 includes a pressure sensing element PU connected to the common voltage Vcom and a control voltage line Psg, and a switching element Qs3 connected to a sensor scanning line Si, the pressure sensing element PU, and a sensor data line Pj.

The pressure sensing element PU includes a pressure switch SW connected to the common voltage Vcom and a driving transistor Qp2 connected between the switch SW and the switching element Qs3.

The pressure switch SW connects the driving transistor Qp2 to the common voltage Vcom under a pressure following a touch exerted on the panel assembly 300. For example, the pressure may make an electrode (not shown) supplied with the common voltage Vcom approach a terminal of the driving transistor Qp2 to be in contact therewith. However, the switch SW may use another physical characteristic for connecting the driving transistor Qp2 to the common voltage Vcom and in this case, the pressure sensing element PU and the pressure switch SW may be referred to as other names.

The driving transistor Qp2 has three terminals, i.e., a control terminal connected to the control voltage line Psg to be biased by the sensor control voltage, an input terminal connected to the switch SW, and an output terminal connected to the switching element Qs3. The driving transistor Qp2 generates and outputs an electrical current upon receipt of the common voltage Vcom from the switch SW.

The switching element Qs3 also has three terminals, i.e., a control terminal connected to the sensor scanning line Si, an input terminal connected to the output terminal of the driving transistor Qp2, and an output terminal connected to the sensor data line Pj. The switching element Qs3 outputs the current from the driving transistor Qp2 to the sensor data line Pj as a sensor output signal in response to the sensor scanning signal from the sensor scanning line Si.

The switching elements Qs1, Qs2 and Qs3, the light sensing element Qp1, and the driving transistor Qp2 may include amorphous silicon or polysilicon thin film transistors (TFTs).

The pressure sensing circuit SC2 indicates the existence of a touch, but it may be unable to accurately indicate the touch position because the pressure area of the touch may cover a wide area. However, the light sensing circuit SC1 may sometimes be able to indicate the touch position of an object by sensing the variation of light illuminance caused by a shadow of the touching object, however it may not be able to correctly indicate the existence of an actual touch since the variation of illuminance can be generated by various causes other than a touch, for example, an object disposed near the panel assembly 300 which does not touch the panel assembly 300 and may nonetheless vary the light illuminance.

One or more polarizers (not shown) are provided at the panel assembly 300.

The image scanning driver 400 is connected to the image scanning lines G1-Gn of the panel assembly 300 and synthesizes a gate-on voltage Von and a gate-off voltage Voff to generate the image scanning signals for application to the image scanning lines G1-Gn.

The image data driver 500 is connected to the image data lines D1-Dm of the panel assembly 300 and applies image data signals to the image data lines D1-Dm.

The sensor scanning driver 700 is connected to the sensor scanning lines S1-SN of the panel assembly 300 and synthesizes a gate-on voltage Von and a gate-off voltage Voff to generate the sensor scanning signals for application to the sensor scanning lines S1-Sn.

The sensing signal processor 800 is connected to the sensor data lines P1-PM of the display panel 300 and receives and analog-to-digitally converts the sensor data signals from the sensor data lines P1-PM to generate digital sensor data signals DSN. The sensor data signals carried by the sensor data lines P1-PM may be current signals and in this case, the sensing signal processor 800 converts the current signals into voltage signals before the analog-to-digital conversion. One sensor data signal carried by one sensor data line P1-PM at a time may include one sensor output signal from one switching elements Qs2 or may include at least two sensor output signals outputted from at least two switching elements Qs2.

The lighting unit 900 is disposed at a rear side or a lateral side of the panel assembly 300 and it includes light sources such as light emitting diodes (LEDs) or fluorescent lamps.

The signal controller 600 controls the image scanning driver 400, the image data driver 500, the sensor scanning driver 700, the sensing signal processor 800, the lighting unit 900, etc.

Each of the processing units 400, 500, 600, 700 and 800 may include at least one integrated circuit (IC) chip mounted on the LC panel assembly 300 or on a flexible printed circuit (FPC) film in a tape carrier package (TCP) type, which are attached to the panel assembly 300. Alternately, at least one of the processing units 400, 500, 600, 700 and 800 may be integrated into the panel assembly 300 along with the signal lines G1-Gn, D1-Dm, S1-SN, P1-PM, Psg and Psd, the switching elements Qs1, Qs2 and Qs3, and the light sensing elements Qp1. Alternatively, all the processing units 400, 500, 600, 700 and 800 may be integrated into a single IC chip, but at least one of the processing units 400, 500, 600, 700 and 800 or at least one circuit element in at least one of the processing units 400, 500, 600, 700 and 800 may be disposed out of the single IC chip.

The operation of the above-described LCD is described below in detail.

The signal controller 600 is supplied with input image signals R, G and B and input control signals for controlling the display thereof from an external graphics controller (not shown). The input control signals include a vertical synchronization signal Vsync, a horizontal synchronization signal Hsync, a main clock MCLK, and a data enable signal DE.

On the basis of the input control signals and the input image signals R, G and B, the signal controller 600 generates image scanning control signals CONT1, image data control signals CONT2, sensor scanning control signals CONT3, and sensor data control signals CONT4, and it processes the image signals R, G and B suitable for the operation of the display panel 300. The signal controller 600 sends the scanning control signals CONT1 to the image scanning driver 400, the processed image signals DAT and the data control signals CONT2 to the image data driver 500, the sensor scanning control signals CONT3 to the sensor scanning driver 700, and the sensor data control signals CONT4 to the sensing signal processor 800.

The image scanning control signals CONT1 include an image scanning start signal STV for instructing to start image scanning and at least one clock signal for controlling the output time of the gate-on voltage Von. The image scanning control signals CONT1 may include an output enable signal OE for defining the duration of the gate-on voltage Von.

The image data control signals CONT2 include a horizontal synchronization start signal STH for informing of start of image data transmission for a group of pixels PX, a load signal LOAD for instructing to apply the image data signals to the image data lines D1-Dm, and a data clock signal HCLK. The image data control signal CONT2 may further include an inversion signal RVS for reversing the polarity of the image data signals (with respect to the common voltage Vcom).

Responsive to the image data control signals CONT2 from the signal controller 600, the image data driver 500 receives a packet of the digital image signals DAT for the group of pixels PX from the signal controller 600, converts the digital image signals DAT into analog image data signals, and applies the analog image data signals to the image data lines D1-Dm.

The image scanning driver 400 applies the gate-on voltage Von to an image scanning line G1-Gn in response to the image scanning control signals CONT1 from the signal controller 600, thereby turning on the switching transistors Qs1 connected thereto. The image data signals applied to the image data lines D1-Dm are then supplied to the display circuit DC of the pixels PX through the activated switching transistors Qs1.

The difference between the voltage of an image data signal and the common voltage Vcom is represented as a voltage across the LC capacitor Clc, which is referred to as a pixel voltage. The LC molecules in the LC capacitor Clc have orientations depending on the magnitude of the pixel voltage, and the molecular orientations determine the polarization of light passing through the LC layer 3. The polarizer(s) converts the light polarization into the light transmittance to display images.

By repeating this procedure by a unit of a horizontal period (also referred to as "1H" and equal to one period of the horizontal synchronization signal Hsync and the data enable signal DE), all image scanning lines G1-Gn are sequentially supplied with the gate-on voltage Von, thereby applying the image data signals to all pixels PX to display an image for a frame.

When the next frame starts after one frame finishes, an inversion control signal RVS applied to the image data driver 500 is controlled such that the polarity of the image data signals is reversed (which is referred to as "frame inversion"). The inversion control signal RVS may be also controlled such that the polarity of the image data signals flowing in a data line are periodically reversed during one frame (for example, row inversion and dot inversion), or the polarity of the image data signals in one packet are reversed (for example, column inversion and dot inversion).

Concurrently, the sensor scanning driver 700 applies the gate-on voltage Von to the sensor scanning lines S1-SN to turn on the switching elements Qs2 and Qs3 connected thereto in response to the sensing control signals CONT3. Then, the switching elements Qs2 and Qs3 output sensor output signals to the sensor data lines P1-PM to form sensor data signals, and the sensor data signals are inputted into the sensing signal processor 800.

The sensing signal processor 800 amplifies and filters the read sensor data signals and converts the analog sensor data signals into digital sensor data signals DSN to be sent to the signal controller 600 in response to the sensor data control signals CONT4. The signal controller 600 appropriately processes signals from the sensing signal processor 800 to determine whether and where a touch exists. The signal controller 600 sends information about the touch to (external) devices that demand the information. An external device may send image signals generated based on the information to the LCD.

The detailed structures of LC panel assemblies according to embodiments of the present invention are described in detail below with reference to FIGS. 4, 5 and 6.

Figure 4:
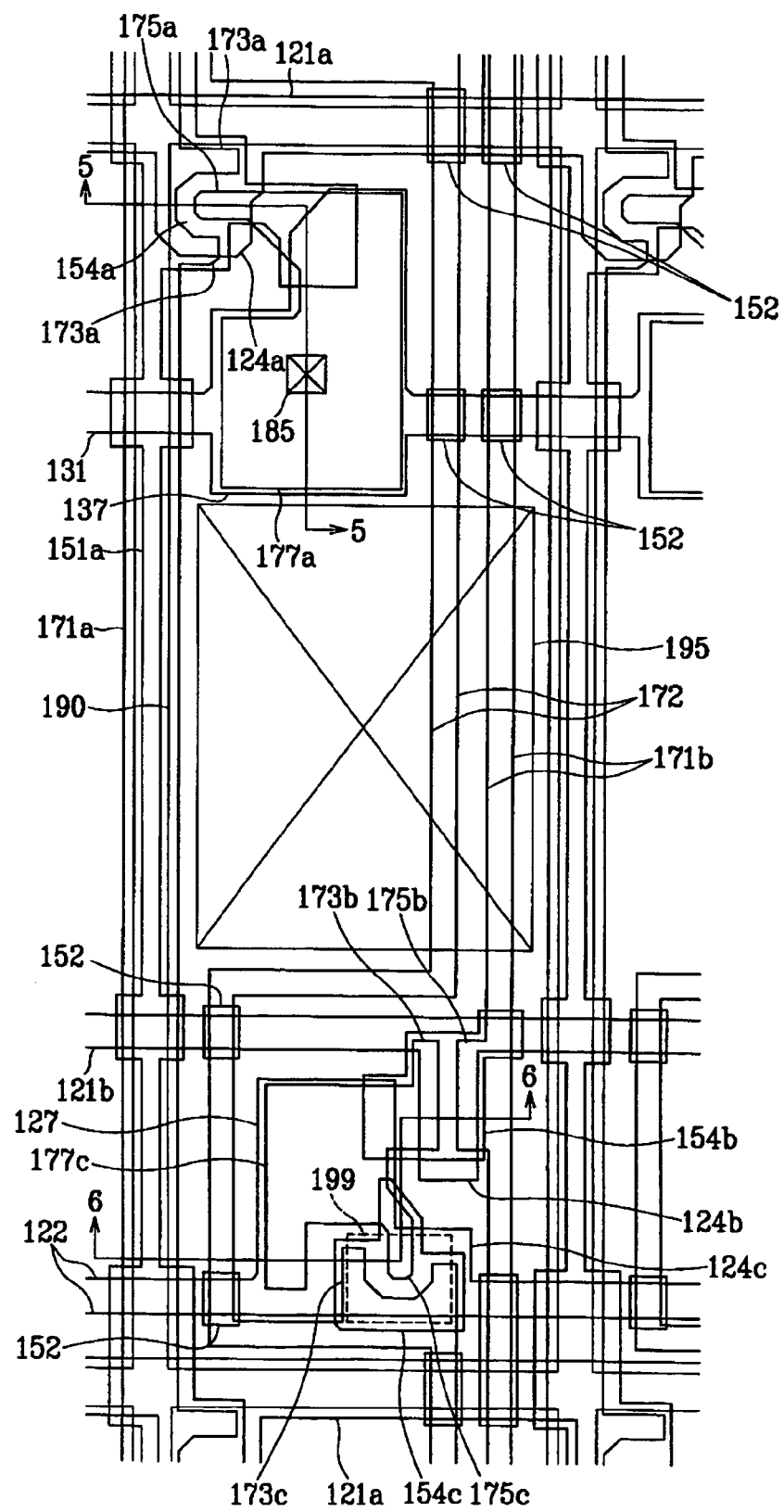
FIG. 4 is a layout view of a LC panel assembly according to an embodiment of the present invention.
Figure 5:
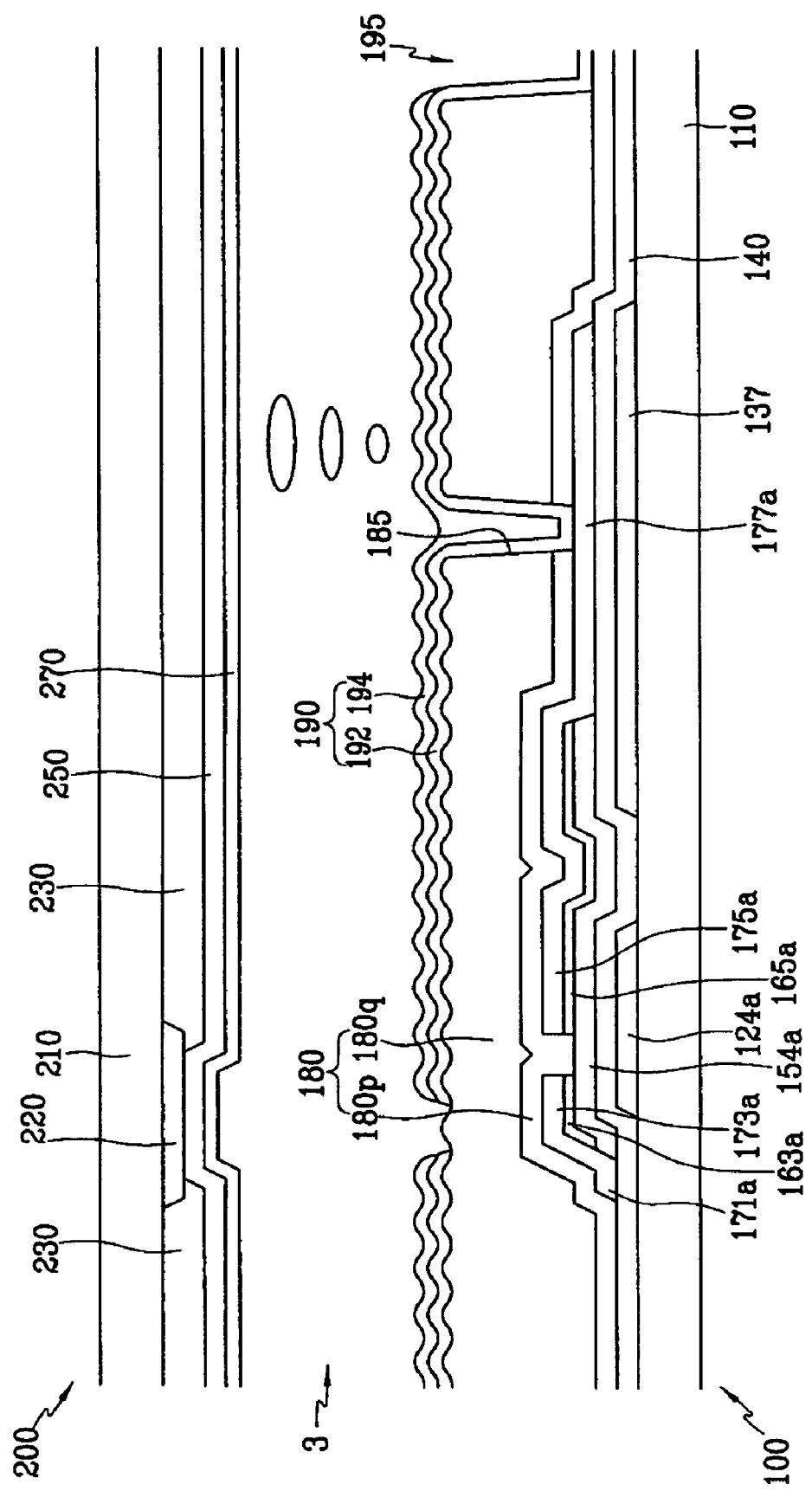
FIG. 5 is a sectional view of the panel assembly shown in FIG. 4 taken along line 5-5.
Figure 6:
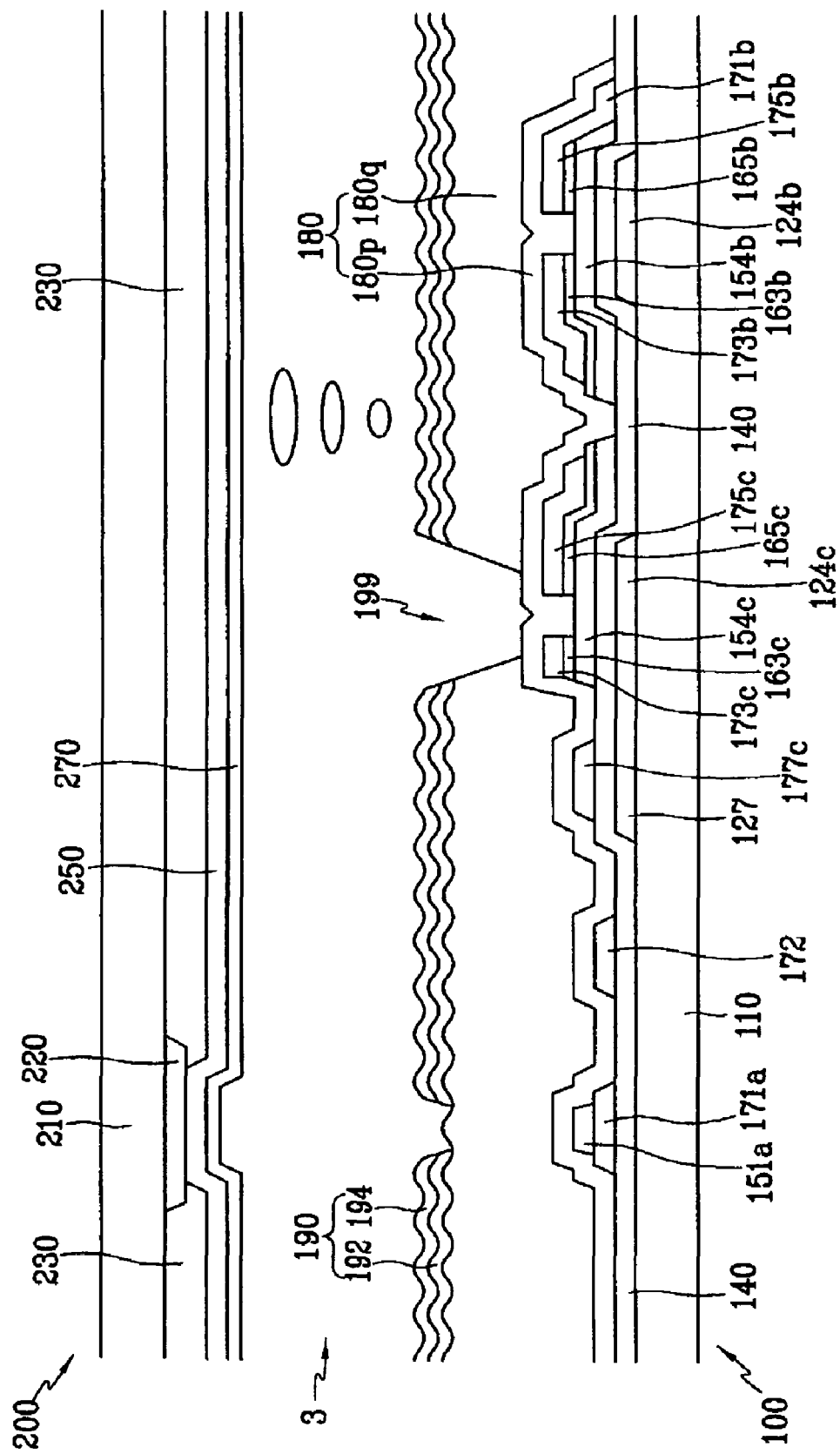
FIG. 6 is a sectional view of the panel assembly shown in FIG. 4 taken along line 6-6.

FIG. 4 is a layout view of a LC panel assembly according to an embodiment of the present invention, FIG. 5 is a sectional view of the panel assembly shown in FIG. 4 taken along line 5-5, and FIG. 6 is a sectional view of the panel assembly shown in FIG. 4 taken along line 6-6.

Each of LC panel assemblies according to embodiments of the present invention includes a TFT array panel 100, a common electrode panel 200 facing the TFT array panel, and a liquid crystal (LC) layer 3 interposed between the panels 100 and 200.

A plurality of gate conductors including a plurality of image scanning lines 121a, a plurality of storage electrode lines 131, a plurality of sensor scanning lines 121b, and a plurality of control voltage lines 122 are formed on an insulating substrate 110 such as transparent glass or plastic.

The image scanning lines 121a transmit image scanning signals and extend substantially in a transverse direction. Each of the image scanning lines 121a includes a plurality of first control electrodes 124a projecting downward.

The storage electrode lines 131 are supplied with a predetermined voltage such as a common voltage and extend substantially parallel to the image scanning lines 121a. Each of the storage electrode lines 131 is disposed close to an image scanning line 121a and includes a plurality of storage electrodes 137 expanding upward and downward.

The sensor scanning lines 121b transmit sensor scanning signals and extend substantially parallel to the image scanning lines 121a. Each of the sensor scanning lines 121b includes a plurality of second control electrodes 124b projecting downward.

The control voltage lines 122 are supplied with a sensor control voltage and extend substantially parallel to the sensor scanning lines 121b. Each of the control voltage lines 122 is disposed close to a sensor scanning line 121b and includes a plurality of third control electrodes 124c projecting upward and a plurality of expansions 127 projecting upward.

The gate conductors 121a, 121b, 122 and 131 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, they may have a multi-layered structure including two conductive films (not shown) having different physical characteristics. One of the two films is preferably made of low resistivity metal including Al containing metal, Ag containing metal, and Cu containing metal for reducing signal delay or voltage drop. The other film is preferably made of material such as Mo containing metal, Cr, Ta, or Ti, which has good physical, chemical, and electrical contact characteristics with other materials such as indium tin oxide (ITO) or indium zinc oxide (IZO). Good examples of the combination of the two films are a lower Cr film and an upper Al (alloy) film and a lower Al (alloy) film and an upper Mo (alloy) film. However, the gate conductors 121a, 121b, 122 and 131 may be made of various metals or conductors.

The lateral sides of the gate conductors 121a, 121b, 122 and 131 are inclined relative to a surface of the substrate 110, and the inclination angle thereof ranges about 30-80 degrees.

A gate insulating layer 140 preferably made of silicon nitride (SiNx) or silicon oxide (SiOx) is formed on the gate conductors 121a, 121b, 122 and 131.

A plurality of semiconductor stripes 151a and a plurality of semiconductor islands 154b, 154c and 152 are formed on the gate insulating layer 140. The semiconductor stripes and islands 151a, 154b, 154c and 152 are preferably made of hydrogenated amorphous silicon (abbreviated to "a-Si") or polysilicon.

The semiconductor stripes 151a extend substantially in a longitudinal direction and become wide near the scanning lines 121a and 121b, the storage electrode lines 131, and the control voltage lines 122 such that the semiconductor stripes 151a cover large areas of the scanning lines 121a and 121b, the storage electrode lines 131, and the control voltage lines 122. Each of the semiconductor stripes 151a has a plurality of projections 154a disposed on the first control electrodes 124a.

The semiconductor islands 154b and 154c are disposed on the second and third control electrodes 124b and 124c, respectively, and each of the semiconductor islands 154b includes an extension covering edges of the sensor scanning lines 121b.

The semiconductor islands 152 are disposed on the scanning lines 121a and 121b, the storage electrode lines 131, and the control voltage lines 122.

A plurality of ohmic contact stripes 161a and a plurality of first ohmic contact islands 165a are formed on the semiconductor stripes 151a, a plurality of second and third ohmic contact islands 163b and 165b are formed on the semiconductor islands 154b, and a plurality of fourth and fifth ohmic contact islands 163c and 165c are formed on the semiconductor islands 154c. In addition, a plurality of other ohmic contact islands (not shown) are formed on the semiconductor islands 152. The ohmic contacts 161a, 163b, 163c and 165a-165c are preferably made of silicide or n+hydrogenated a-Si heavily doped with n type impurity such as phosphorous.

Each of the ohmic contact stripes 161a includes a plurality of projections 163a, and the projections 163a and the first ohmic contact islands 165a are located in pairs on the projections 154a of the semiconductor stripes 151a. The second and the third ohmic contact islands 163b and 165b are located in pairs on the semiconductor islands 154b, and the fourth and fifth ohmic contact islands 163c and 165c are located in pairs on the semiconductor islands 154c.

The lateral sides of the semiconductor stripes and islands 151a, 154b, 154c and 152 and the ohmic contacts 161a, 163b, 163c and 165a-165c are inclined relative to the surface of the substrate 110, and the inclination angles thereof are preferably in a range of about 30-80 degrees.

A plurality of data conductors including a plurality of image data lines 171a, a plurality of sensor data lines 171b, a plurality of electrode members 177c, a plurality of input voltage lines 172, and a plurality of first output electrodes 175a are formed on the ohmic contacts 161a, 163b, 163c and 165a-165c and the gate insulating layer 140.

The image data lines 171a transmit image data signals and extend substantially in the longitudinal direction to intersect the scanning lines 121a and 121b, the storage electrode lines 131, and the control voltage lines 122. Each of the image data lines 171a includes a plurality of first input electrodes 173a projecting toward the first control electrodes 124a.

The first output electrodes 175a are separated from the data lines 171a and 171b and the input voltage lines 172 and disposed opposite the first input electrodes 173a with respect to the first control electrodes 124a. Each of the first output electrodes 175a includes a wide end portion 177a and a narrow end portion. The wide end portion 177a overlaps a storage electrode 137 and the narrow end portion is partly enclosed by a first input electrode 173a that is curved.

The sensor data lines 171b transmit sensor data signals and extend substantially in the longitudinal direction to intersect the scanning lines 121a and 121b, the storage electrode lines 131, and the control voltage lines 122. Each of the sensor data lines 171b includes a plurality of second output electrodes 175b projecting toward the second control electrodes 124b.

The electrode members 177c are separated from the data lines 171a and 171b and the input voltage lines 172. Each of the electrode members 177c overlaps an expansion 127 of a control voltage line 122 to form a sensor capacitor Cp and includes a second input electrode 173b and a third output electrode 175c disposed on the ohmic contacts 163b and 165c, respectively. The second input electrode 173b faces a second output electrode 175b.

The input voltage lines 172 transmit a sensor input voltage and extend substantially in the longitudinal direction to intersect the scanning lines 121a and 121b, the storage electrode lines 131, and the control voltage lines 122. Each of the input voltage lines 172 curves around the electrode members 177c and includes a plurality of third input electrodes 173c projecting toward the third control electrodes 124c. The third input electrodes 173c are disposed opposite the third output electrodes 175c with respect to the third control electrodes 124c and they are curved like a character U to partly enclose the third output electrodes 175c.

A first control electrode 124a, a first input electrode 173a, and a first output electrode 175a along with a projection 154a of a semiconductor stripe 151a form a switching TFT Qs1 having a channel formed in the projection 154a disposed between the first input electrode 173a and the first output electrode 175a.

A second control electrode 124b, a second input electrode 173b, and a second output electrode 175b along with a semiconductor island 154b form a switching TFT Qs2 having a channel formed in the semiconductor island 154b disposed between the second input electrode 173b and the second output electrode 175b.

A third control electrode 124c, a third input electrode 173c, and a third output electrode 175c along with a semiconductor island 154c form a photosensor TFT Qp having a channel formed in the semiconductor island 154c disposed between the third input electrode 173c and the third output electrode 175c. The photosensor TFT Qp may be substituted with a pressure sensor TFT Qt.

The data conductors 171a, 171b, 172, 175a and 177c are preferably made of refractory metal such as Cr, Mo, Ta, Ti, or alloys thereof. However, they may have a multilayered structure including a refractory metal film (not shown) and a low resistivity film (not shown). Good examples of the multilayered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data conductors 171a, 171b, 172, 175a and 177c may be made of various metals or conductors.

The data conductors 171a, 171b, 172, 175a and 177c have inclined edge profiles, and the inclination angles thereof range about 30-80 degrees.

The ohmic contacts 161a, 163b, 163c and 165a-165c are interposed only between the underlying semiconductor stripes and islands 151a, 154b, 154c and 152 and the overlying data conductors 171a, 171b, 172, 175a and 177c thereon and reduce the contact resistance therebetween.

Although the semiconductor stripes 151a are narrower than the image data lines 171 at most places, the width of the semiconductor stripes 151a becomes large near the scanning lines 121a and 121b, the storage electrode lines 131, and the control voltage lines 122 as described above, to smooth the profile of the surface, thereby preventing the disconnection of the image data lines 171a and the input voltage lines 172. Likewise, the semiconductor islands 152 and the extensions of the semiconductor islands 154b disposed on the edges of the scanning lines 121a and 121b, the storage electrode lines 131, and the control voltage lines 122 smooth the profile of the surface to prevent the disconnection of the sensor data lines 171b and the input voltage lines 172 there. The semiconductor stripes and islands 151a, 154b, 154c and 152 include some exposed portions, which are not covered with the data conductors 171a, 171b, 172, 175a and 177c, such as portions located between the input electrodes 173a-173c and the output electrodes 175a-175c.

A passivation layer 180 is formed on the data conductors 171a, 171b, 172, 175a and 177c, and the exposed portions of the semiconductor stripes and islands 151a, 154b, 154c and 152.

The passivation layer 180 includes a lower passivation film 180p preferably made of inorganic insulator such as silicon nitride or silicon oxide and an upper passivation film 180q preferably made of organic insulator. The organic insulator preferably has dielectric constant less than about 4.0 and it may have photosensitivity. The upper passivation film 180q has a plurality of openings exposing portions of the lower passivation film 180p and it has unevenness on its surface. The passivation layer 180 may have a single-layer structure preferably made of inorganic or organic insulator.

The passivation layer 180 has a plurality of contact holes 185 exposing the expansions 177a of the first output electrodes 175a. The contact holes 185 may have inclined or stepped sidewalls.

A plurality of pixel electrodes 190 are formed on the passivation layer 180.

Each of the pixel electrodes 190 has unevenness following the unevenness of the upper passivation film 180q and includes a transparent electrode 192 and a reflective electrode 194 disposed thereon. The transparent electrode 192 is preferably made of transparent conductor such as ITO or IZO, and the reflective electrode 194 is preferably made of Al, Ag, Cr, or alloys thereof. However, the reflective electrode 194 they may have a dual-layered structure including a low-resistivity, reflective upper film (not shown) preferably made of Al, Ag, or alloys thereof and a good contact lower film (not shown) preferably made of Mo containing metal, Cr, Ta, or Ti having good contact characteristics with ITO or IZO.

The reflective electrode 194 has a transmissive window 195 disposed in an opening of the upper passivation film 180q and exposing the transparent electrode 192. In addition, the reflective electrode 194 has an opening 199 disposed on a sensor TFT Qp.

The pixel electrodes 190 are physically and electrically connected to the first output electrodes 175a through the contact holes 185 such that the pixel electrodes 190 receive data voltages from the first output electrodes 175a. The pixel electrodes 190 supplied with the image data voltages generate electric fields in cooperation with a common electrode 270 of the common electrode panel 200 supplied with a common voltage Vcom, which determine the orientations of liquid crystal molecules of the liquid crystal layer 3 disposed between the two electrodes 190 and 270. A pixel electrode 190 and the common electrode 270 form a LC capacitor Clc, which stores applied voltages after the switching TFT Qs1 turns off.

A pixel of the panel assembly 300 including the TFT array panel 100, the common electrode panel 200 and the LC layer 3, can be divided into a transmissive region TA and a reflective region RA defined by a transparent electrode 192 and a reflective electrode 194, respectively. In detail, the transmissive region TA includes portions disposed on and under the transmissive windows 195, while the reflective region RA includes portions disposed on and under the reflective electrodes 194. In the transmissive region TA, light incident from a rear surface of the panel assembly 300, i.e., from the TFT array panel 100 passes through the LC layer 3 and goes out of a front surface, i.e., out of the common electrode panel 200, thereby displaying images. In the reflective regions RA, light incident from the front surface enters into the LC layer 3, is reflected by the reflective electrode 194, passes through the LC layer 3 again, and goes out of the front surface, thereby displaying images. At this time, the unevenness of the reflective electrode 194 enhances the efficiency of the light reflection.

A pixel electrode 190 and an expansion 177a of a first output electrode 175a connected thereto overlap a storage electrode line 131 including a storage electrode 137 to form a storage capacitor Cst, which enhances the voltage storing capacity of the liquid crystal capacitor.

The pixel electrodes 190 overlap the scanning lines 121a and 121b, the data lines 171a and 171b, the control voltage lines 122, the input voltage lines 172, and the TFTs Qs1, Qs2 and Qp to increase the aperture ratio.

The description of the common electrode panel 200 will follow.

A light blocking member 220 referred to as a black matrix for preventing light leakage is formed on an insulating substrate 210 such as transparent glass or plastic. The light blocking member 220 defines a plurality of open areas facing the pixel electrodes 190.

A plurality of color filters 230 are also formed on the substrate 210 and they are disposed substantially in the open areas enclosed by the light blocking member 220. The color filters 230 may extend substantially along the longitudinal direction along the pixel electrodes 190 to form stripes. Each of the color filters 230 may represent one of the primary colors such as red, green and blue colors.

An overcoat 250 is formed on the color filters 230 and the light blocking member 220. The overcoat 250 is preferably made of (organic) insulator and it protects the color filters 230, prevents the color filters 230 from being exposed, and provides a flat surface.

A common electrode 270 is formed on the overcoat 250. The common electrode 270 is preferably made of transparent conductive material such as ITO and IZO.

Alignment layers (not shown) for aligning the LC layer 3 may be coated on inner surfaces of the panels 100 and 200, and one or more polarizers (not shown) are provided on outer surfaces of the panels 100 and 200.

The LC layer 3 may be subjected to a homeotropic alignment or a homogeneous alignment. The thickness of the LC layer 3 in the transmissive regions TA is thicker than, in particular, about twice in the reflective regions RA since there is no upper passivation in the transmissive regions TA.

The panel assembly 300 may further include a plurality of elastic spacers (not shown) for forming a gap between the TFT array panel 100 and the common electrode panel 200.

The panel assembly 300 may further include a sealant (not shown) for combining the TFT array panel 100 and the common electrode panel 200. The sealant is disposed around edges of the common electrode panel 200.

A sensing TFT Qp at an untouched position receives the ambient light through an opening 199. However, it does not receive the light from the lighting unit 900 since an opaque control electrode 124c blocks the light from the lighting unit 900 to prevent the light from reaching the channel of the sensing TFT Qp.

However, a sensing TFT Qp under a touch of an object hardly receives the ambient light since the object blocks the ambient light. Instead, the object reflects the light from the lighting unit 900 to reach the channel of the sensing TFT Qp.

Accordingly, both a sensing TFT Qp at a touched position and another sensing TFT Qp at an untouched position can generate photocurrents.

Now, the photocurrent and the sensor output signal of the light sensing units in an LCD according to an embodiment of the present invention will be described with reference to FIGS. 7 and 8.

Figure 7:
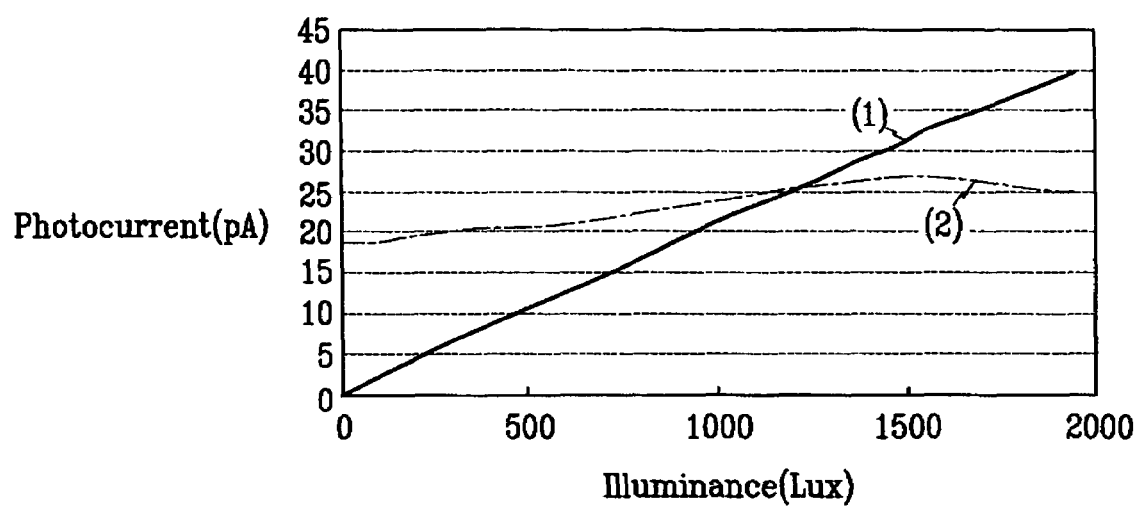
FIG. 7 is a graph illustrating photocurrents of sensing TFTs at a touched position and at an untouched position on a panel assembly 300 as function of illuminance of ambient light.

FIG. 7 is a graph illustrating photocurrents of sensing TFTs at a touched position, shown by curve 2, and at an untouched position, shown by curve 1, on a panel assembly 300 as function of illuminance of ambient light. FIG. 8 is a graph illustrating an output current of a light sensing circuit for different sensing modes according to an embodiment of the present invention.

The magnitude of the photocurrent represented by the curve (1) for an untouched position increases substantially in proportion to the illuminance of the ambient light. However, the curve (2) for a touched position shows little variation as a function according to the value of the illuminance of the ambient light.

The curves (1) and (2) intersect each other near the illuminance of about 1,100 lux and the intersection means the same photocurrent, which yields a dead zone. At the dead zone, the difference in the photocurrent between a touched position and an untouched position is too small to find the touched position. The location of the dead zone may be different depending on the illuminance of the ambient light and the luminance of the lamps of the lighting unit 900.

Figure 8:
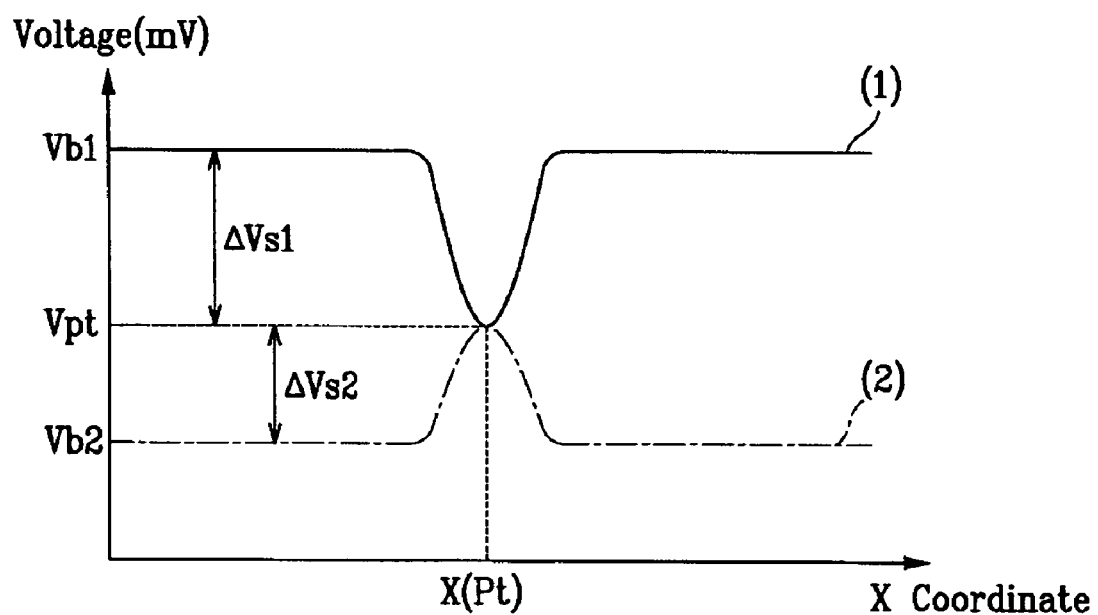
FIG. 8 is a graph illustrating an output current of a light sensing circuit for different sensing modes according to an embodiment of the present invention.

Referring to FIG. 8, the sensor output signals of the light sensing units will be described in a spatial view.

In FIG. 8, a horizontal axis represents the position of sensor data lines P1-PM on the panel assembly 300 along a row direction, and a vertical axis represents the voltage level of sensor output signals in a row.

A touch was exerted on an intersection of a sensor scanning line Si and a sensor data line Pt. The voltage level Vpt of an output signal for the touched position is referred to as a touch voltage and the voltage level Vb1 or Vb2 of an output signal for the untouched position is referred to as a background voltage.

FIG. 8 shows a curve (1) in a shadow mode where the touch voltage Vpt is lower than a background voltage Vb1 and a curve (2) in a lighting mode where the touch voltage Vpt is higher than a background voltage Vb2.

The shadow mode works when the ambient light is relatively bright, and in particular, when the ambient light is brighter than the light reflected by a touch such that the touch voltage Vpt is smaller than the background voltage Vb1. On the contrary, the lighting mode works when the ambient light is relatively dark, and in particular, the ambient light is darker than the light reflected by a touch that the touch voltage Vpt is greater than the background voltage Vb1.

As described above, the background voltages Vb1 and Vb2 are determined primarily on the intensity of the ambient light, and the touch voltage Vpt is determined by the luminance of the lighting unit 900. However, when the LCD is in the dead zone near the boundary of the shadow mode and the lighting mode, that is, when the difference $\Delta VS1/\Delta VS2$ between the background voltage Vb1/Vb2 and the touch voltage Vpt is small, it is difficult to determine the touched position.

Referring to FIG. 7 again, the LCD operates in the lighting mode when the ambient light is darker than a reflected light by a touching object, while the LCD operates in the shadow mode when the ambient light is brighter than the reflected light. The photocurrent represented by the curve (1) corresponds to the background voltage Vb1 or Vb2, while the photocurrent represented by the curve (2) corresponds to the touch voltage Vpt.

Described below is a sensing operation of an LCD for avoiding the dead zone according to embodiments of the present invention taken together with reference to FIGS. 9, 10, 11, 12, 13 and 14.

Figure 9:
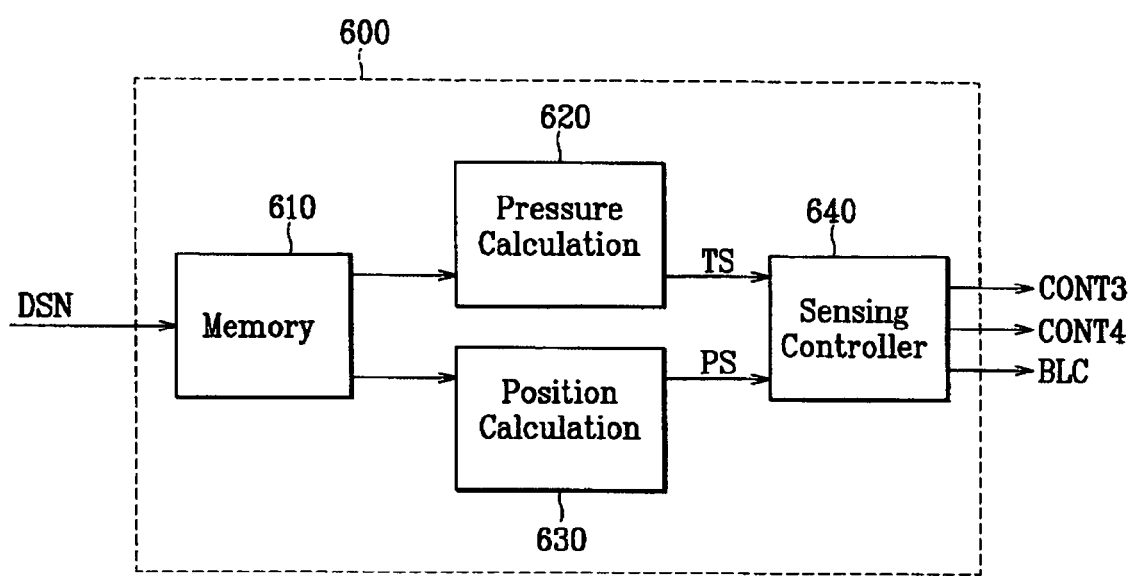
FIG. 9 is a block diagram of a signal controller for an LCD according to an embodiment of the present invention.
Figure 10:
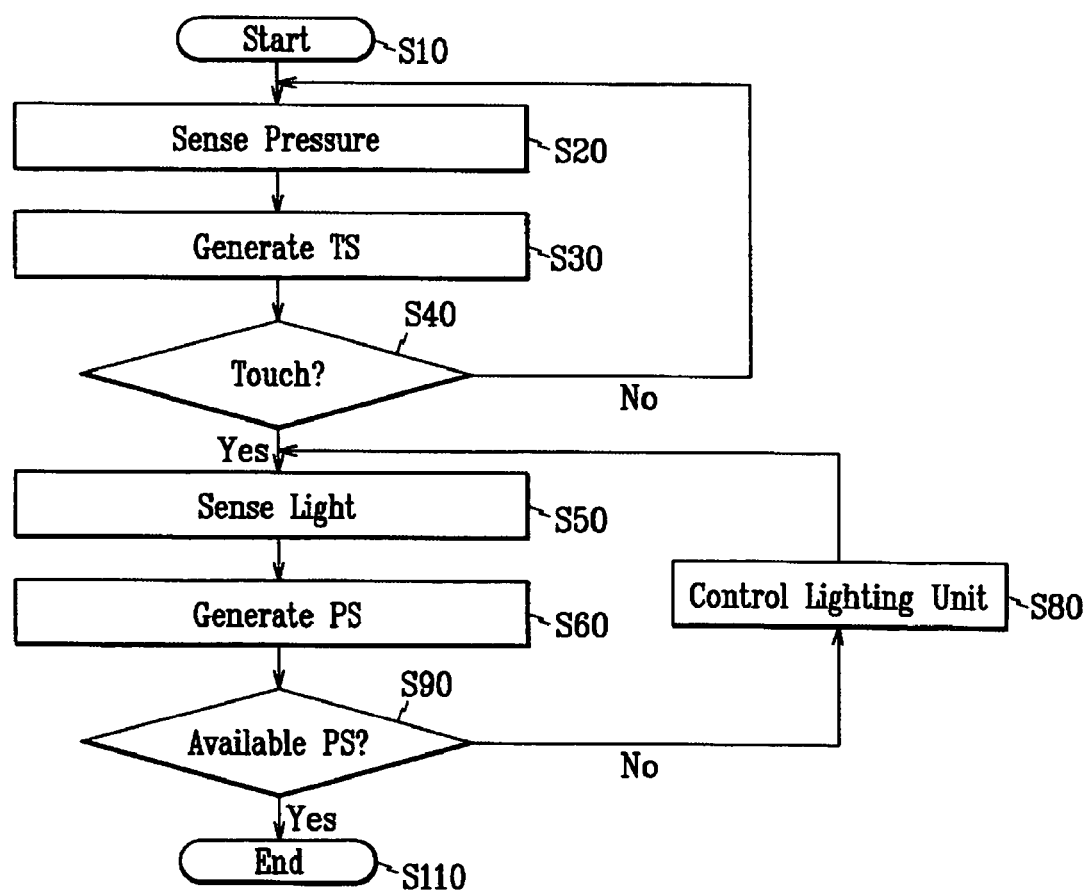
FIG. 10 is an exemplary flow chart illustrating a sensing operation of the LCD shown in FIG. 1.

FIG. 9 is a block diagram of a signal controller an LCD according to an embodiment of the present invention, and FIG. 10 is an exemplary flow chart illustrating a sensing operation of the LCD shown in FIG. 10.

Referring to FIG. 9, a signal controller 600 includes a memory 610, a pressure calculation unit 620 and a position calculation unit 630 that are connected to the memory 610, and a sensing controller 640 connected to the pressure calculation unit 620 and the position calculation unit 630.

The memory 610 receives the digital sensor data signals DSN from the sensing signal processor 800 and stores the digital sensor data signals DSN.

The pressure calculation unit 620 reads the digital sensor data signals DSN associated with pressure sensing circuits SC2 from the memory 610 and determines whether a touch exists to generate a pressure information signal TS.

The position calculation unit 630 reads the digital sensor data signals DSN associated with the light sensing units SC1 from the memory 610 and determines where a touch exists to generate a position information signal PS.

The sensing controller 640 generates sensor scanning control signals CONT3, sensor data control signals CONT4, and lighting control signals BLC based on the pressure information signal TS and the position information signal PS to be sent to a sensor scanning driver 700, the sensing signal processor 800, and a lighting unit 900.

At least one of the memory 610, the pressure calculation unit 620, the position calculation unit 630, and the sensing controller 640 may be separated from the signal controller 600.

Now, the sensing operation of the LCD will be described in detail.

Referring to FIG. 10, when an operation starts (S10), the sensing controller 640 outputs the sensor scanning control signals CONT3 and the sensor data control signals CONT4 to the sensor scanning driver 700 and the sensing signal processor 800, respectively. The sensor scanning driver 700 applies scanning signals to the pressure sensing circuits SC2 in response to the sensor scanning control signals CONT3 such that the pressure sensing circuits SC2 output sensor output signals to form sensor data signals (S20).

The sensing signal processor 800 reads the sensor data signals in response to the sensor data control signals CONT4 and generates digital sensor data signals DSN to be written into the memory 610. The pressure calculation unit 620 reads out the digital sensor data signals DSN from the memory 610 and calculates the digital sensor data signals DSN to generate a pressure information signal TS (S30).

The sensing controller 640 receives the pressure information signal TS and determines whether a touch exists from the pressure information signal TS (S40).

When the pressure information signal TS indicates that there is no touch, the sensing controller 640 repeats the step (S20).

When the pressure information signal TS indicates that there is a touch, the sensing controller 640 controls the sensor scanning driver 700 to apply scanning signals to the light sensing units SC1 such that the light sensing units SC1 output sensor output signals to form sensor data signals (S50).

In addition, the sensing controller 640 controls the sensing signal processor 800 to receive the sensor data signals and to generate the digital sensor data signals DSN to be written into the memory 610. The position calculation unit 630 reads out the digital sensor data signals DSN from the memory 610 and calculates the digital sensor data signals DSN to generate a position information signal PS (S60).

The sensing controller 640 receives the position information signal PS and determines from the pressure information signal TS whether the position information signal PS contains available information about the position of the touch (S90).

When the position information signal PS is available, the sensing controller 640 extracts the position information of the touch from the position information signal PS (S80). The sensing controller 640 sends the position information to another device and returns the process (S110).

When the position information signal PS is not available, the sensing controller 640 generates and outputs lighting control signals BLC to the lighting unit 900 (S80) and returns to the step 50.

To summarize, the pressure sensing circuits SC2 are driven to determine whether a touch exists and the light sensing circuits SC1 are driven when it is determined that a touch exists to determine where the touch occurred. Subsequently, when the light sensing circuits SC1 give available information on the position of the touch, the position information is sent to another device that uses the information. However, when the information supplied by the light sensing circuits SC1 is not available, it is concluded that the LCD is in a dead zone and the lighting unit 900 is utilized to obtain available position information.

Examples of ways to control of the lighting unit 900 in the step S80 include:

(1) changing the luminance of the lighting unit 900 by varying the on/off state of the lamps in the lighting unit 900 or varying the current to the lamps in the lighting unit 900 during the light sensing scanning; and (2) changing the phase of a driving voltage supplied to the lamps in the lighting unit 900 so that the sensing operation may be performed in the on/off state of the lamps.

The control operation of the lighting unit and the sensing operation is described in detail below with reference to FIGS. 11-13.

Figure 11:
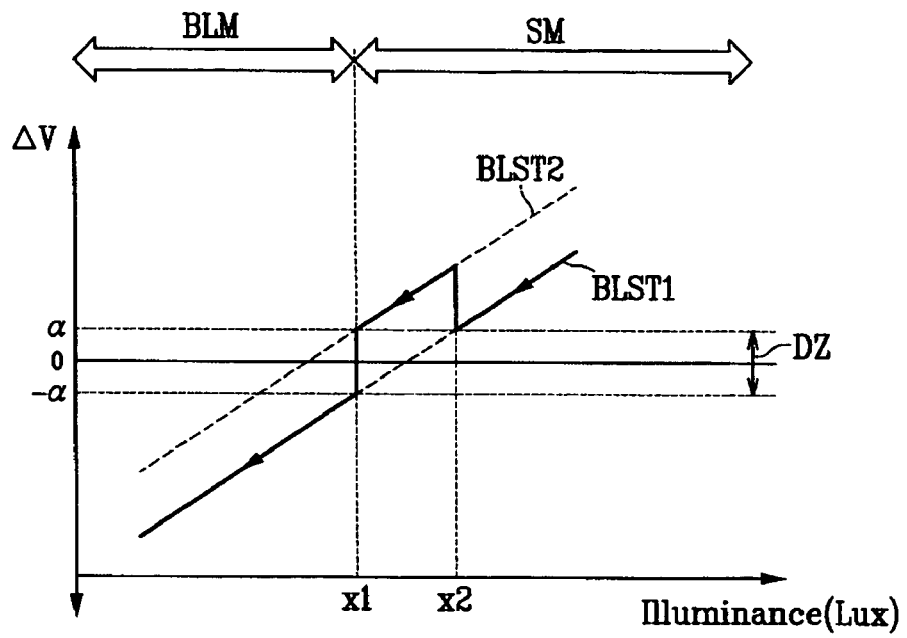
FIGS. 11 and 12 are graphs illustrating an exemplary operation of an LCD according to an embodiment of the present invention.
Figure 12:
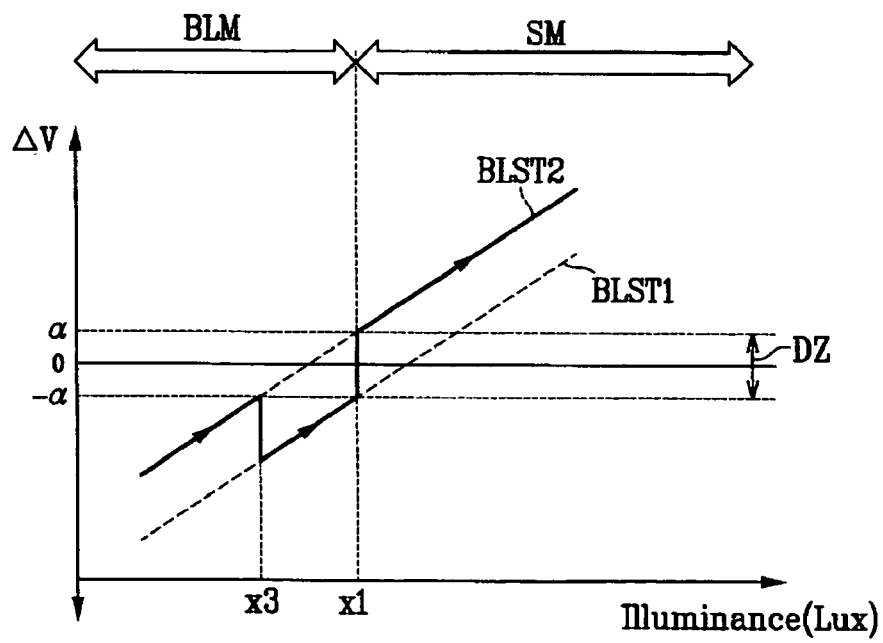
Figure 13:
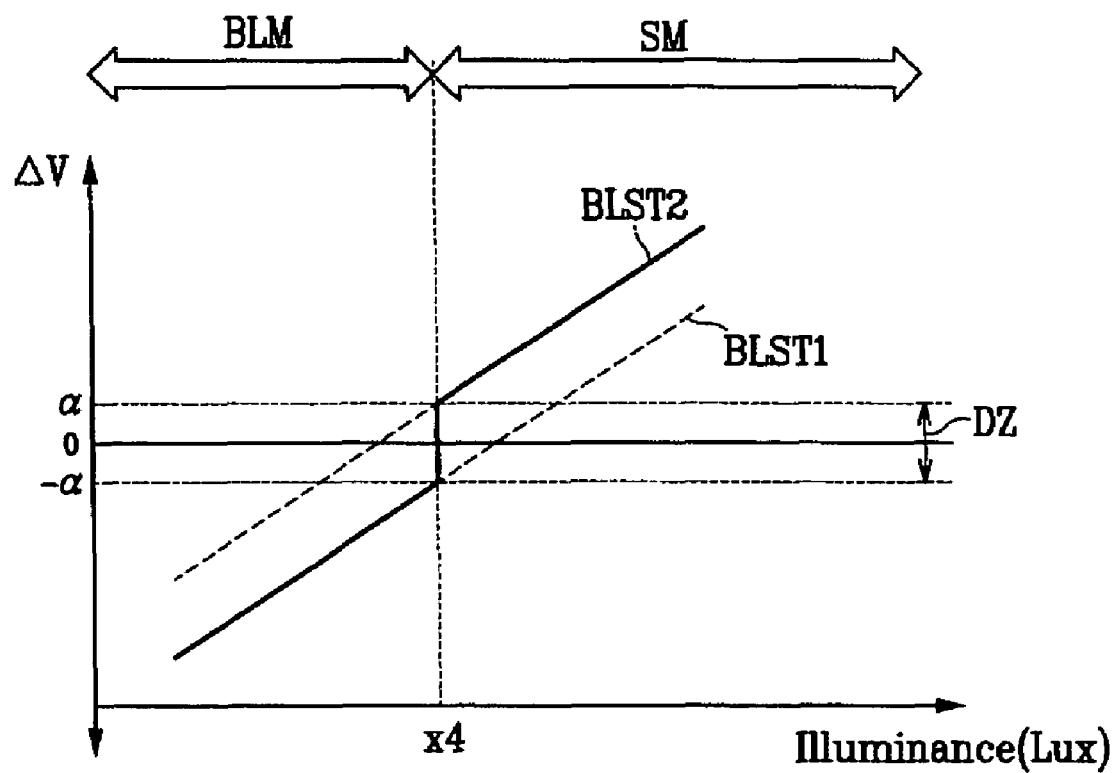
FIG. 13 is a graph illustrating an exemplary operation of an LCD according to another embodiment of the present invention.

FIGS. 11 and 12 are graphs illustrating an exemplary operation of an LCD according to an embodiment of the present invention, and FIG. 13 is a graph illustrating an exemplary operation of an LCD according to another embodiment of the present invention.

In FIGS. 11-13, the horizontal axis indicates the illuminance of an ambient light in lux, and the vertical axis indicates a voltage difference $\Delta V$ equal to a background voltage Vb subtracted by a touch voltage Vpt.

A dead zone DZ occurs when the voltage the voltage difference $\Delta V$ is equal from about $-\alpha$ to about $\alpha$, where $\alpha$ is a predetermined value. The oblique lines indicate the voltage differences $\Delta V$ for states BLST1 and BLST2 of the lamps in the lighting unit 900. The LCD operates in a lighting mode BLM under the illuminance of the ambient light lower than a predetermined illuminance ×1, while the LCD operates in a shadow mode SM under the illuminance of the ambient light higher than the predetermined illuminance ×1. Since the touch voltage Vpt cannot be extracted in the dead zone DZ, the voltage difference $\Delta V$ cannot be also calculated.

First, the control operation of the lighting unit and the sensing operation according to the control scheme (1) will be described with reference FIGS. 11-13.

In FIGS. 11-13, the luminance of the LCD is high in the lamp state BLST1 where the lamps are turned on or the current of the lamps is large, while the luminance of the LCD is high in the lamp state BLST2 where the lamps are turned off or the current of the lamps is small. Here, it is noted that the lamp states BLST1 and BLST2 are the states of the lamps during a period when the light sensing units SC1 generate and output sensing signals, and the lamp states BLST1 and BLST2 do not indicate the states of the lamps during the remaining period when the lamps normally operate.

First, an exemplary operation shown in FIGS. 11 and 12 will be described.

Referring to FIG. 11, when the illuminance of the ambient light becomes lower in the lamp state BLST1 to reach a predetermined illuminance ×2 in the dead zone DZ, the sensing controller 640 outputs the lighting control signals BLC to the lighting unit 900 to convert the states of the lamps. The lamps turn into the lamp state BLST2 and the luminance of the lamps becomes low. Therefore, the touch voltage Vpt is reduced to increase the voltage difference $\Delta V$ and thus the LCD still operates in the shadow mode SM.

When the illuminance of the ambient light continues to be lowered and reaches the illuminance ×1 to meet the dead zone DZ again, the sensing controller 640 outputs the lighting control signals BLC to the lighting unit 900 to convert the state of the lamps from the lamp state BLST2 into the lamp state BLST1. The luminance of the lamps becomes high to increase the touch voltage Vpt such that the LCD operates in the lighting mode BLM.

Referring to FIG. 12, when the illuminance of the ambient light becomes high in the lamp state BLST2 to reach a predetermined illuminance ×3 in the dead zone DZ, the sensing controller 640 outputs the lighting control signals BLC to the lighting unit 900 to convert the state of the lamps from the lamp state BLS2 into the lamp state BLST1. Then, the luminance of the lamps becomes high to reduce the touch voltage Vpt such that the LCD still operates in the lighting mode BLM.

When the illuminance of the ambient light continues to rise and reaches the illuminance ×1 to meet the dead zone DZ again, the sensing controller 640 outputs the lighting control signals BLC to the lighting unit 900 to convert the state of the lamps from the lamp state BLST1 into the lamp state BLST2. The luminance of the lamps becomes low to decrease the touch voltage Vpt such that the LCD operates in the shadow mode SM.

Next, another exemplary operation shown in FIG. 13 will be described.

In FIG. 13, when the illuminance of the ambient light becomes low in the lamp state BLST2 and reaches a predetermined illuminance ×4 to meet the dead zone DZ, the sensing controller 640 outputs the lighting control signals BLC to the lighting unit 900 to convert the state of the lamps from the lamp state BLST2 into the lamp state BLST1. Then, the luminance of the lamps becomes high to increase the touch voltage Vpt such that the LCD operates in the lighting mode BLM.

However, when the illuminance of the ambient light becomes high in the lamp state BLST1 and reaches the predetermined illuminance ×4 to meet the dead zone DZ, the sensing controller 640 outputs the lighting control signals BLC to the lighting unit 900 to convert the state of the lamps from the lamp state BLST1 into the lamp state BLST2. Then, the luminance of the lamps becomes low to decrease the touch voltage Vpt such that the LCD operates in the shadow mode SM.

In this way, the dead zone DZ in the sensing operation can be avoided by turning on and off the lamps or by changing the current of the lamps.

The control operation of the lighting unit and the sensing operation related thereto according to the control scheme (2) is described below in detail with reference to FIGS. 13 and 14.

Figure 14:
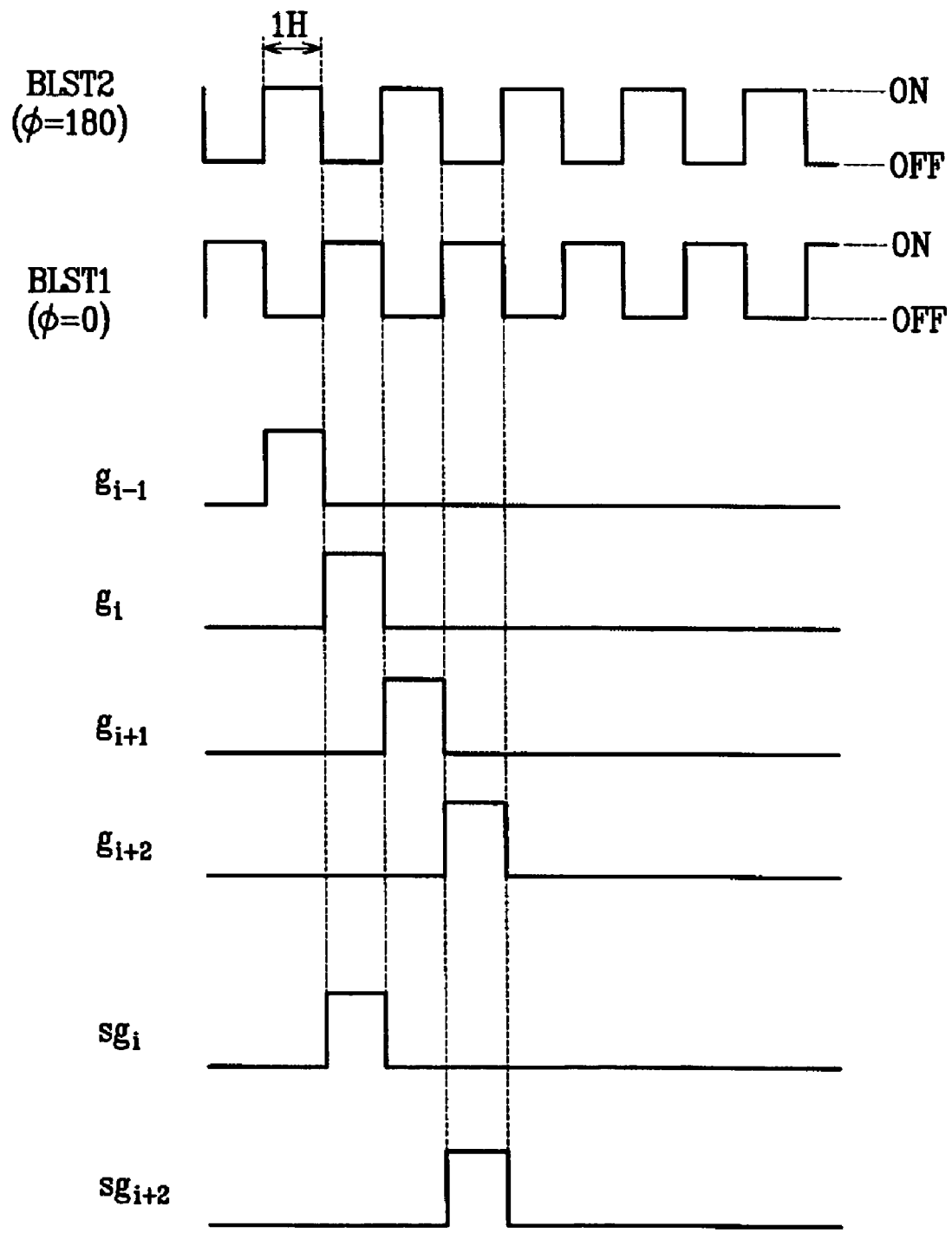
FIG. 14 is a timing diagram of various signals of an LCD according to an embodiment of the present invention.

FIG. 14 is a timing chart of various signals of an LCD according to an embodiment of the present invention.

Referring to FIG. 14, the lamps turns on and off in a period of 2H, the image scanning signals gi are applied to the image scanning signals G1-Gn every 1H, and the sensor scanning signals sgi are applied to the sensor scanning lines S1-SN every 2H.

In FIGS. 13 and 14, different backlight states BLST1 and BLST2 indicate different phases but not different magnitudes of luminance. For example, the lamp state BLST1 indicates that the lamps are turned on (i.e., the phase of the lamps (p=0) during a period when the light sensing units SC1 generate and output sensing signals, while the lamp state BLST2 indicates that the lamps are turned off ((φ=180) during the sensing period. That is, if the phase is equal to 0°, the scanning signals sgi are applied when the lamps are turned on. However, if the phase is equal to 180°, the scanning signals sgi are applied when the lamps are turned off. The phase equal to 0° or 180° means that the phase of the lamps is synchronized with the image scanning signals gi and the sensor scanning signals sgi.

Referring to FIG. 13, when the illuminance of the ambient light becomes low in the lamp state BLST2 having a phase of 180° and reaches a predetermined illuminance ×4 to meet the dead zone DZ, the sensing controller 640 outputs the lighting control signals BLC to the lighting unit 900 to convert the state of the lamps from the lamp state BLST2 into the lamp state BLST1 having a phase of 0°. Then, the touch voltage Vpt is increased such that the LCD operates in the lighting mode BLM.

However, when the illuminance of the ambient light becomes high in the lamp state BLST1 and reaches the predetermined illuminance ×4 to meet the dead zone DZ, the sensing controller 640 outputs the lighting control signals BLC to the lighting unit 900 to convert the state of the lamps from the lamp state BLST1 into the lamp state BLST2. Then, the touch voltage Vpt decreases to allow the LCD operating in the shadow mode SM.

Although the duty ratio, which is defined as the ratio of turn-on time and the turn-off time, in this embodiment is equal to 50%, the duty ratio may range from about 40-60%. The phase of the lamps in the lighting mode BLM may range from about −10° to about 10°, or the phase of the lamps in the shadow mode SM may range from about 170° to about 190°.

In this way, the dead zone DZ in the sensing operation can be avoided by changing the phase of the lamps without the variation of the luminance of the lamps.

According to another embodiment of the present invention, the lamps have a single state and the application time of the sensor scanning signals sgi may be changed to obtain substantially the same result as described above. For example, the sensor scanning signals sgi are applied during the turn-on of the lamps, and then the sensor scanning signals sgi are applied during the turn-off of the lamps when the dead zone occurs.

In this way, the light sensing units SC1 can avoid the dead zone DZ by changing the states of the lighting unit or by changing the time for sensing ambient light 외다.

The above-described embodiments can be also applied to any of non-emissive display devices and self-emissive display devices such as organic light emitting diode display, field emission display, etc.

Although preferred embodiments in accordance with the present disclosure of invention have been described in detail herein, it should be clearly understood that many variations and/or modifications of the basic inventive concepts herein taught may become apparent to those skilled in the present art in light of the present disclosure and as such these will still fall within the spirit and scope of the present teachings.

What is claimed is:

1. A display device comprising:
    a display panel;
    a lighting unit adapted to illuminate the display panel in response to receipt of a lighting control signal;
    a pressure sensing unit adapted to generate a first sensor output signal in response to a touch on the display panel;
    a light sensing unit positioned to receive light from the lighting unit and ambient light and in response thereto to generate a second sensor output signal in response to a touch on the display panel;
    a sensor scanning driver adapted to generate and supply sensor scanning signals to the pressure sensing unit and to the light sensing unit in response to receipt of a sensor scanning control signal; and
    a signal controller being operable to generate the lighting control signal and the sensor scanning control signal in response to receipt of the first and the second sensor output signals, the signal controller being further operable to transmit the lighting control signal and the sensor scanning control signal to the lighting unit and the sensor scanning driver, respectively, the signal controller comprising:
    a pressure calculation unit being operable to generate a pressure information signal in receipt of the first sensor output signal;
    a position calculation unit being operable to determine where a touch occurred to generate a position information signal in response to the second sensor output signal; and
    a sensing controller, wherein the sensing controller receives the pressure information signal and the position information signal and generates the lighting control signal in response to a failure to detect the touched position in the received position information signal.

2. The display device of claim 1, wherein the lighting control signal is operable to control a luminance of the lighting unit.

3. The display device of claim 2, wherein the lighting control signal causes the lighting unit to be in either an operable or nonoperable state.

4. The display device of claim 2, wherein the lighting control signal controls a magnitude of a current driving the lighting unit.

5. The display device of claim 1, wherein the lighting control signal controls a phase of a driving voltage of the lighting unit.

6. The display device of claim 5, wherein the lighting control signal is operable to vary a duty ratio of the driving voltage of the lighting unit from 40% to 60%.

7. The display device of claim 5, wherein the phase of the driving voltage ranges from −10° to 10° and form 170° to 190° if the phase of the driving voltage is defined to be 0° when the phase of the driving voltage is synchronized with the sensor scanning signals.

8. The display device of claim 1, wherein the sensing controller controls a light sensing period of the light sensing unit according to an on/off state of the lighting unit in the dead zone.

9. The display device of claim 1, wherein the pressure sensing unit and the light sensing unit are disposed on the display panel.

10. The display device of claim 1, wherein the display device is a liquid crystal display.

11. A method of driving a display device including a display panel and a lighting unit, the method comprising:
generating a first sensing signal based on a pressure exerted on a display panel;
generating a pressure information signal as a function of the first sensing signal;
generating a second sensing signal responsive to receipt of light from the lighting unit and ambient light;
generating a position information signal as a function of the second sensing signal;
determining whether the display device is under a condition for a dead zone based on the pressure information signal and the position information signal; and
performing a control operation by controlling the lighting unit or by controlling a timing for generating the second sensing signal when the display device is under a condition for the dead zone,
wherein the determination of whether the display device is under a condition for the dead zone comprises: determining that the display device is under a condition for the dead zone when the pressure information signal indicates that a touch exists but the position information signal fails to indicate the touched position.

12. The method of claim 11, wherein the control of the lighting unit comprises:
controlling a luminance of the lighting unit.

13. The method of claim 12, wherein the control of the luminance of the lighting unit comprises:
changing an on/off state of the lighting unit.

14. The method of claim 11, wherein the control of the luminance of the lighting unit comprises:
changing a current driving the lighting unit.

15. The method of claim 11, wherein the control of the lighting unit comprises:
changing a phase of a driving voltage of the lighting unit relative to the timing for generating the second sensing signal.

16. The method of claim 11, wherein the control of the timing for generating the second sensing signal comprises:
changing the timing for generating the second sensing signal relative to a phase of a driving voltage of the lighting unit.

* * * * *